United States Patent [19]
Ida et al.

[11] Patent Number: 5,331,436
[45] Date of Patent: Jul. 19, 1994

[54] ENCODER AND DECODER

[75] Inventors: Takashi Ida, Ichikawa; Kenshi Dachiku, Tokyo, both of Japan

[73] Assignee: Kabushiki Kaisha Toshiba, Kawasaki, Japan

[21] Appl. No.: 128,144

[22] Filed: Sep. 29, 1993

Related U.S. Application Data

[62] Division of Ser. No. 816,651, Jan. 3, 1992, Pat. No. 5,274,466.

[30] Foreign Application Priority Data

Jan. 7, 1992 [JP] Japan .......................... 3-278

[51] Int. Cl.$^5$ .............................................. H04N 7/12
[52] U.S. Cl. .................................... 358/426; 348/415
[58] Field of Search ............... 358/426, 433, 133, 136; 382/43, 56

[56] References Cited

U.S. PATENT DOCUMENTS

| | | |
|---|---|---|
| 4,831,659 | 5/1989 | Miyaoka et al. ............ 358/433 |
| 4,878,230 | 10/1989 | Murakami ...................... 358/136 |
| 4,941,193 | 7/1990 | Barnsley et al. ............. 358/136 |
| 5,001,560 | 3/1991 | Ericsson ....................... 358/136 |

*Primary Examiner*—Stephen Brinich
*Attorney, Agent, or Firm*—Oblon, Spivak, McClelland, Maier & Neustadt

[57] ABSTRACT

An encoder comprises a memory for storing a to-be-coded original image, outputting a to-be-coded image signal in response to a to-be-coded region designation signal for designating a to-be-coded region used as a to-be-coded block, and outputting a to-be-transformed image signal in response to a to-be-transformed region designation signal for designating a to-be-transformed region; a transforming circuit for subjecting the to-be-transformed image signal to a predetermined transformation in response to a transformation method designation signal, and outputting a transformed image signal; a deciding circuit for deciding an error of the transformed image signal with reference to the to-be-coded image signal, and a control circuit for outputting, as a code, information on at least the to-be-transformed region and the transformation method which reduce the error decided by the deciding circuit to a predetermined value or below.

5 Claims, 18 Drawing Sheets

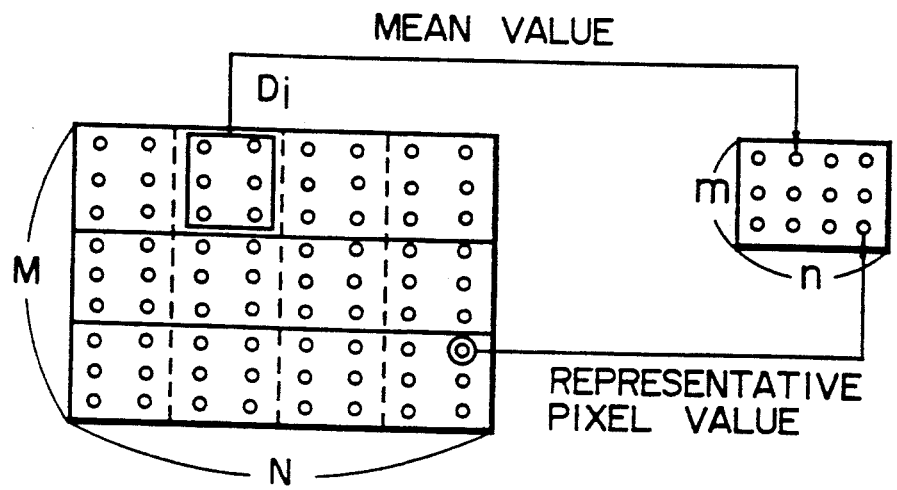
F I G. 3A
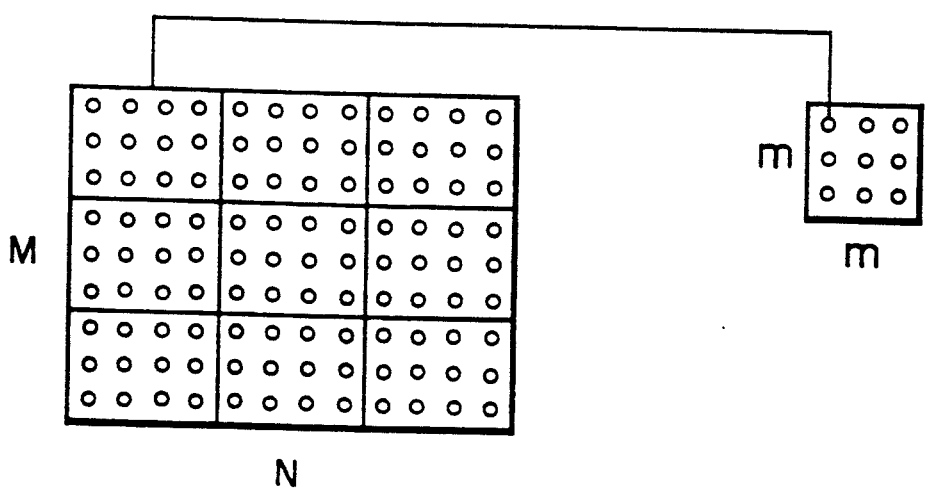
F I G. 3B

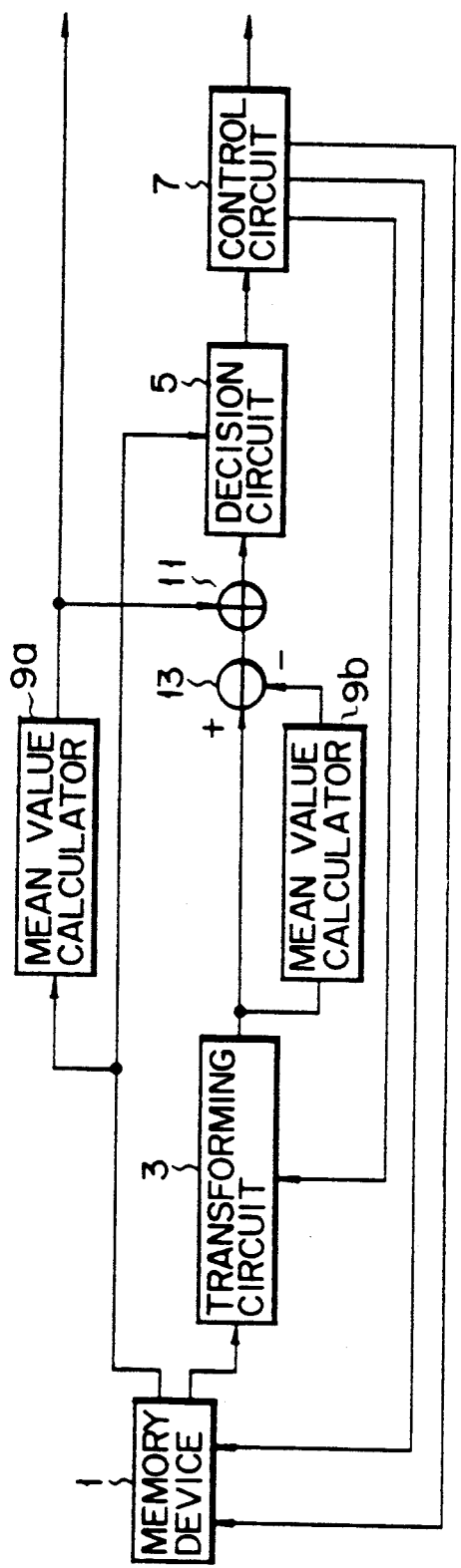
F I G. 7
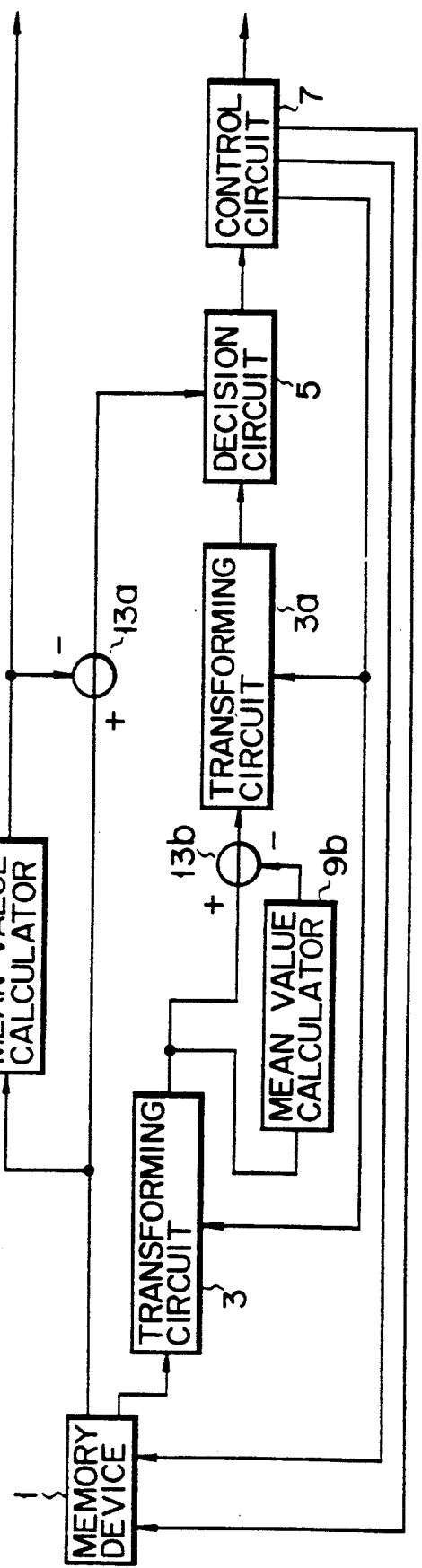
F I G. 8

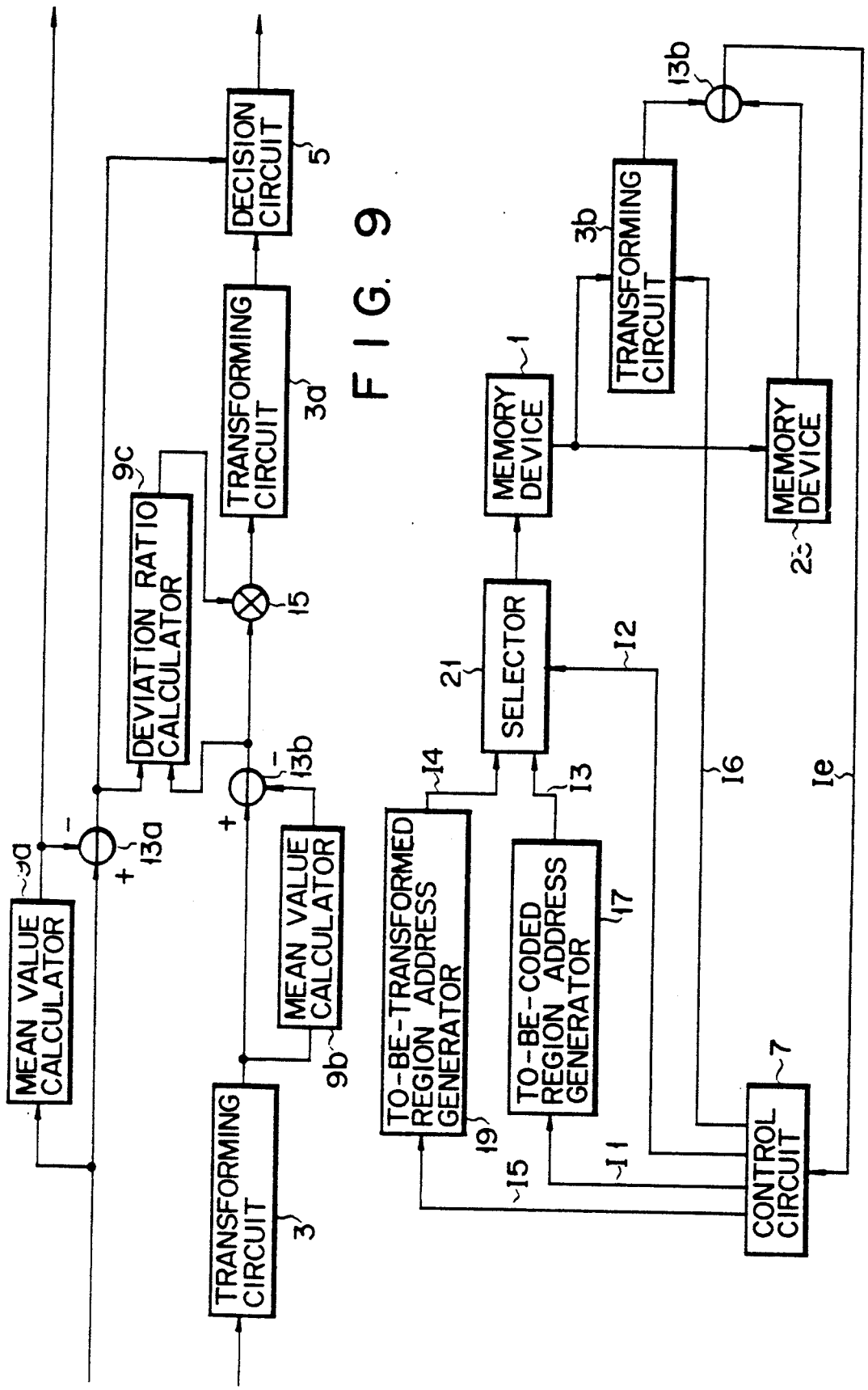

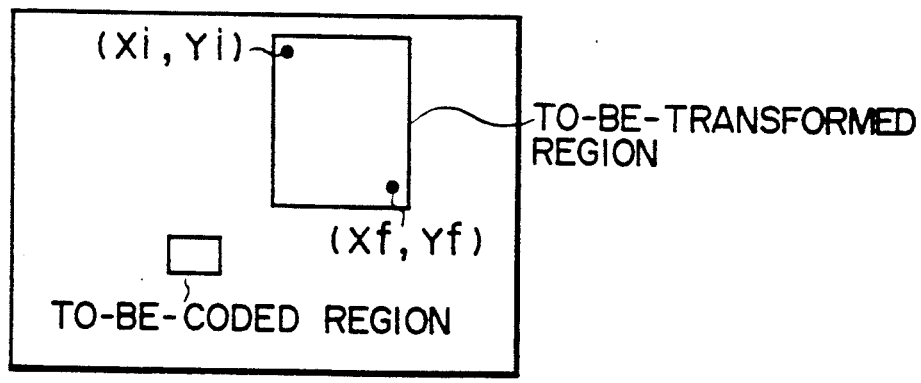
F I G. 17
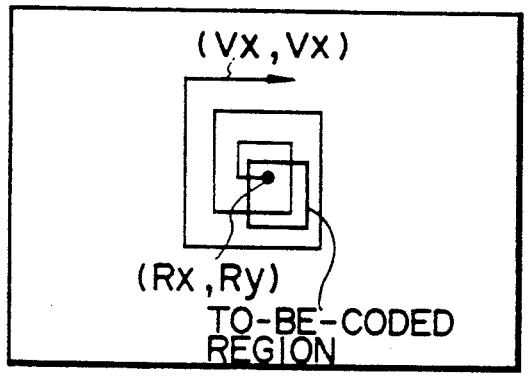
F I G. 18
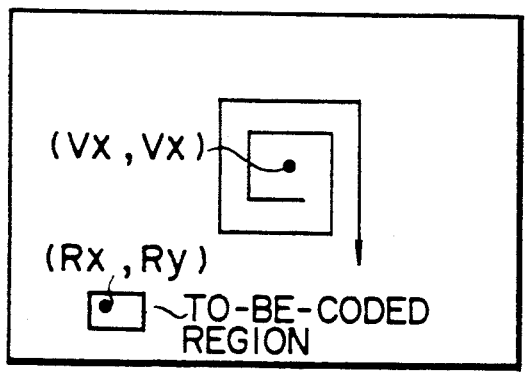
F I G. 19

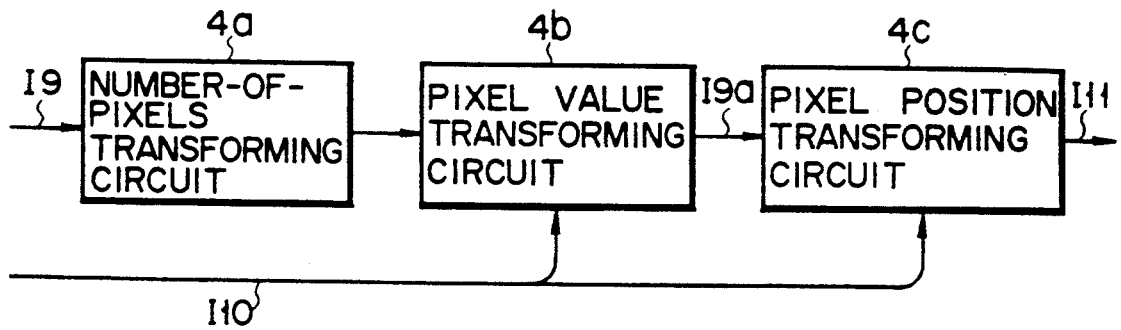
FIG. 20
SEQUENCE OF INPUT DATA
| 1 | 2 | 3 | 4 |
|---|---|---|---|
| 5 | 6 | 7 | 8 |
| 9 | 10 | 11 | 12 |
| 13 | 14 | 15 | 16 |
FIG. 21
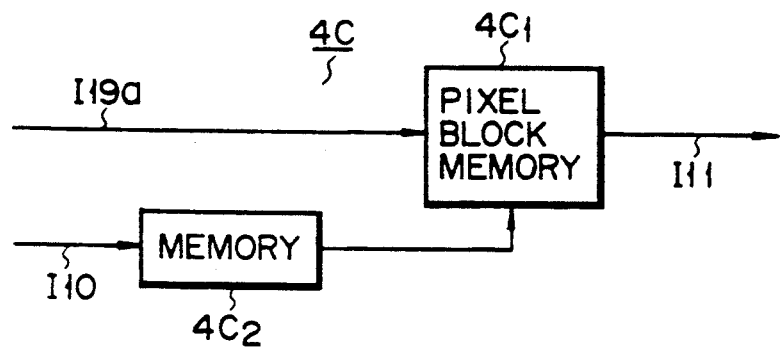
FIG. 22

| 13 | 14 | 15 | 16 |
|----|----|----|----|
| 9  | 10 | 11 | 12 |
| 5  | 6  | 7  | 8  |
| 1  | 2  | 3  | 4  |

1

| 4  | 3  | 2  | 1  |
|----|----|----|----|
| 8  | 7  | 6  | 5  |
| 12 | 11 | 10 | 9  |
| 16 | 15 | 14 | 13 |

2

| 4 | 8 | 12 | 16 |
|---|---|----|----|
| 3 | 7 | 11 | 15 |
| 2 | 6 | 10 | 14 |
| 1 | 5 | 9  | 13 |

3

| 16 | 15 | 14 | 13 |
|----|----|----|----|
| 12 | 11 | 10 | 9  |
| 8  | 7  | 6  | 5  |
| 4  | 3  | 2  | 1  |

4

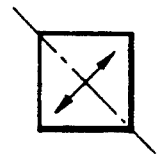
F I G. 27    5
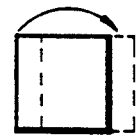
F I G. 28    6
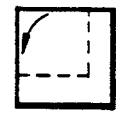
F I G. 29    7
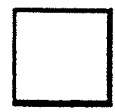
F I G. 30    0

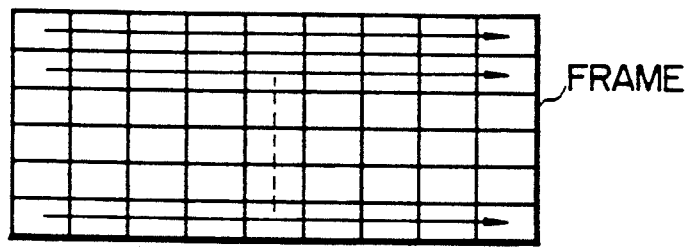
F I G. 32
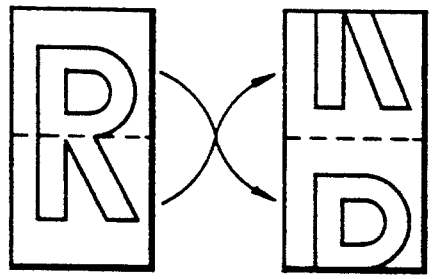
F I G. 33
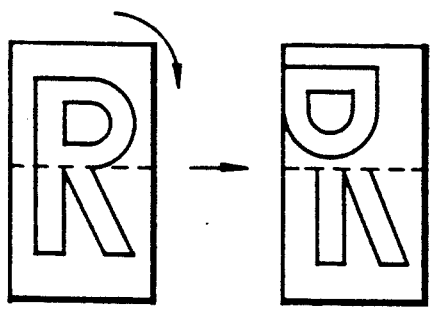
F I G. 34

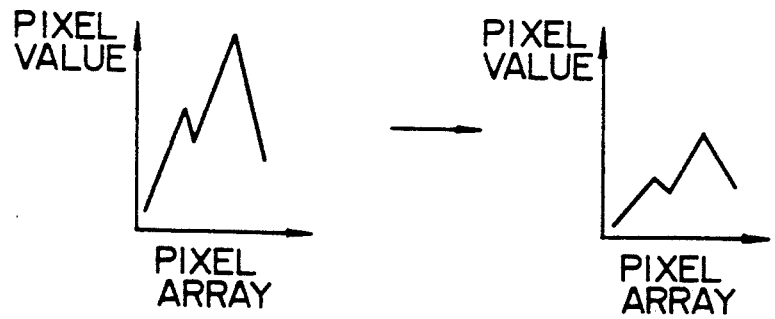
F I G. 35
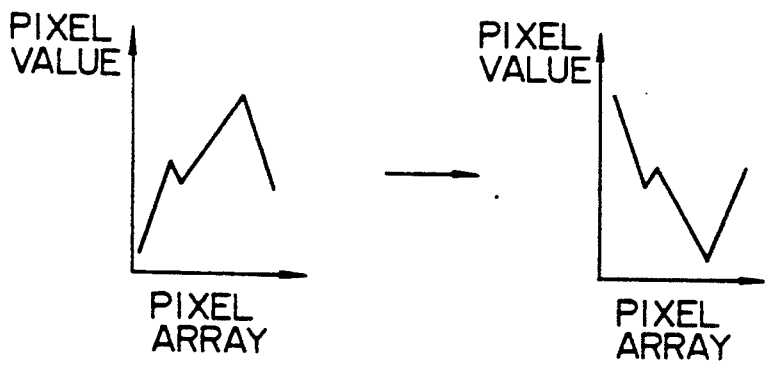
F I G. 36
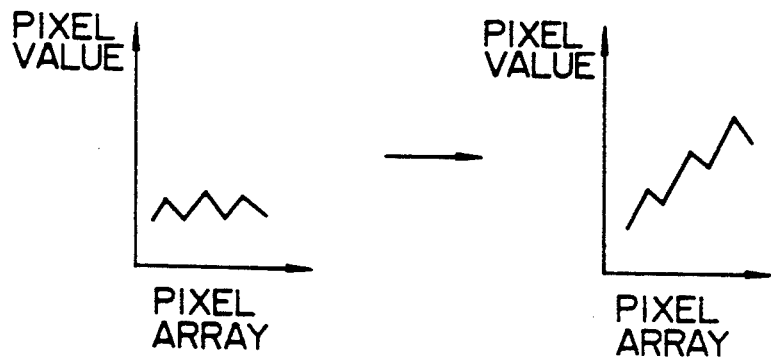
F I G. 37

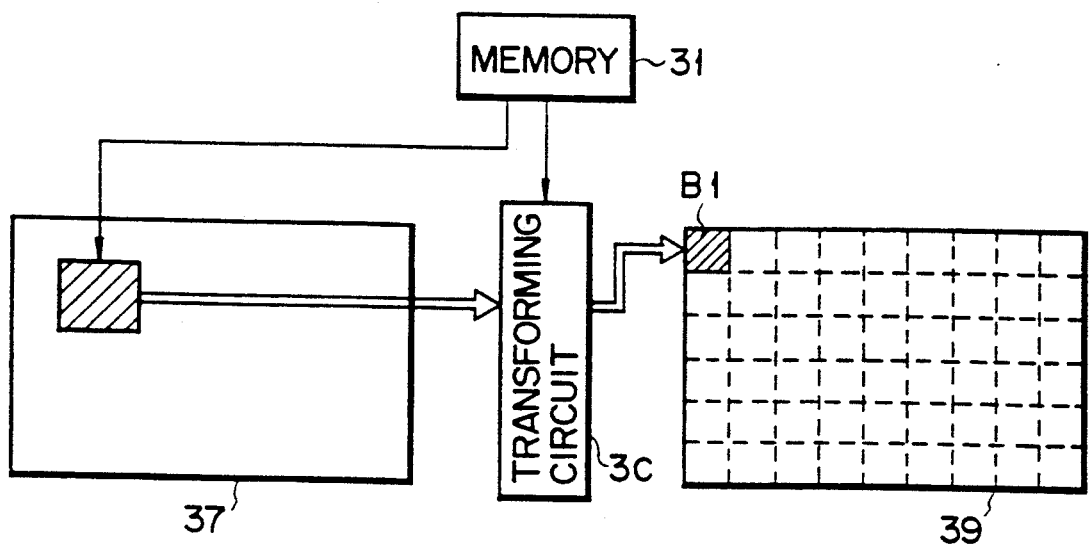
F I G. 38
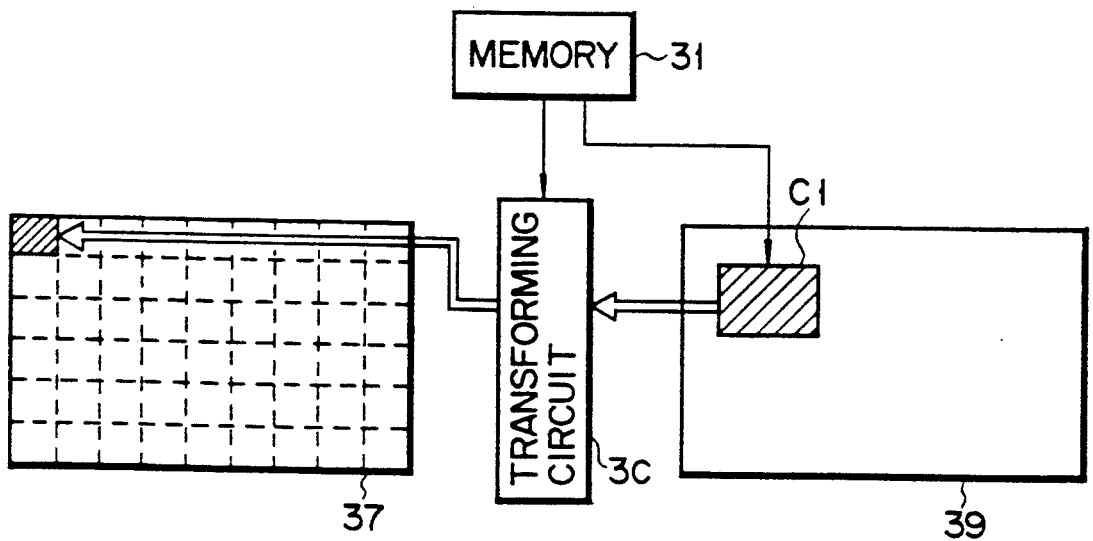
F I G. 39

ENCODER AND DECODER

This is a division of application Ser. No. 07/816,651, filed on Jan. 3, 1992 now U.S. Pat. No. 5,274,466.

BACKGROUND OF THE INVENTION

1. Field of the Invention

The present invention relates to an encoder and a decoder relating to an iterated transformation coding system.

2. Description of the Related Art

Recently, in communication systems and various information processing systems, the need to treat image data has increased, and it is important to develop techniques for transmitting or storing image signals with high performance and efficiency. Statistically, an image signal includes redundant components. By removing the redundant components, data for expressing the image signal can be compressed.

Various coding systems for reducing the proportion of redundancy of image have been proposed. The most important system, from the fundamental and practical viewpoint, is a transformation coding system. In the meantime, a returned transformation coding system has recently been reported under the name of "ITT (Iterated Transformation Theory)-based coding" in an academic society (Arnaud E. Jacquin "A NOVEL FRACTAL BLOCK-CODING TECHNIQUE FOR DIGITAL IMAGE", ICASSP'90 M8.2 1990 IEEE).

This coding system is characterized in that an original image is divided into a predetermined number of regions, and an image most similar to the image of the divided region is searched from transformed images obtained by subjecting the images of the regions different from the divided region to transformation (e.g. compression, rotation). The selected transformed image is changed to a code word, thereby compressing the image. In other words, this coding system is based on self-similarity, that is, this system is based on a fact that the image similar to each of the divided images of divided regions of an original image exists in divided regions different from the above divided region. In this context, the fact that a divided image A and a divided image B are similar to each other means that, in a three-dimensional space defined by an image plane (x, y) and a pixel value axis perpendicular to the image plane, there is a transformation capable of making the image curve surfaces of two divided images A and B coincide with each other. Specifically, the image curve surface of divided image A can be made to coincide with that of divided image B by suitable transformation such as reduction or rotation.

Hereinafter, the divided region of the original divided image to be transformed is referred to as "to-be-transformed image region", the original divided image of the to-be-transformed is "to-be-transformed image" (image A in the above example), the region of the original divided image is "to-be-coded region", and the original image of this to-be-coded region is "to-be-coded image" (image B in the above example). The coding information in this coding system includes a transform method, to-be-transformed region, and to-be-coded region. According to this coding system, transform methods are designated to all images of partial regions obtained by dividing one frame. Thus, a code word representing each of the divided images of one frame includes information relating to the method of dividing a frame, transform method, to-be-transformed region and to-be-coded region. The information relating to the to-be-coded region, however, can be omitted by predetermining the method of dividing the frame, numbering the divided regions sequentially, and arranging coding information according to the sequential numbers.

In the aforementioned report, an original image is divided into a plurality of blocks each including $8 \times 8$ pixels, the to-be-coded region has $8 \times 8$ pixels or $4 \times 4$ pixels, and the to-be-transformed region is a square with one side having double the pixels of one side of the to-be-coded region, i.e. with $16 \times 16$ pixels or $8 \times 8$ pixels. As the transform method, the following are employed singly or in combination: a transformation for equalizing the number of pixels of a to-be-transformed region to that of a to-be-coded region, a transformation for multiplying the pixel value by a fixed number, a transformation for adding a fixed number to the pixel value, a transformation for setting the pixel value to a fixed value, a positional transformation for rotating the pixels of a to-be-transformed region by a unit of 90°, and a transformation for exchanging the pixels of a to-be-transformed region in a line-symmetrical manner. As a code word, there is employed information on a transform method for minimizing an error between a to-be-coded image and a transformed image obtained by subjecting the to-be-coded image to the above transformation.

On the other hand, in a decoding operation, an initial frame divided similarly with an original image is first employed. An image of the initial frame is, for example, an entirely black image. Then, the regions of the frame are converted according to coding words, thereby changing the pixel values. A resultant frame is called "first iterated frame." In this case, the regions of the first returned frame are converted not sequentially, but simultaneously.

By simultaneously converting all the regions of the first iterated frame, a second iterated frame is produced. Similar transformations are repeated, and the initial frame becomes gradually closer to the coded original image. When the returned frame has become close to the original image to a certain extent, the pixel values are no more changed by the transformations and the returned frame does not become close to the original image any more. The returned frame at this time is treated as a decoded image. The decoded image obtained by the above iterated transformation operation is definitely determined in relation to one transformation. In the aforementioned report, an eighth iterated frame is employed as a decoded image.

This coding system is advantageous in that the texture of the original image appears on the decoded image with higher fidelity, than in other coding systems such as a predictive coding system, transform coding system, vector quantization coding system, etc. However, an encoder and a decoder for working the above coding system have not been realized, and realization thereof has been demanded. In the iterated transformation system according to the above report, the shape of the to-be-coded region is limited to a square shape, and also the shape of the to-be-transformed region is limited to a square with one side having double the dimension of one side of the to-be-coded region. Consequently, the number of candidates for a to-be-transformed region similar to a to-be-coded region is small, and the decoded image is not necessarily close to the original image sufficiently, despite the fact that the number of codes is large. As a result, the coding efficiency is degraded.

SUMMARY OF THE INVENTION

The object of the present invention is to provide an iterated transformation encoder and a decoder having high coding efficiency.

According to the present invention, there is provided an encoder comprising a memory for storing a to-be-coded image, outputting a to-be-coded image signal by means of a to-be-coded region designation signal for designating a to-be-coded region employed as a to-be-coded block, and outputting a to-be-transformed region image signal by means of a to-be-transformed region designation signal for designating a to-be-transformed region; a transforming circuit for subjecting the to-be-transformed image signal to a predetermined transformation by means of a transformation method designating signal, and outputting a transformation image signal; a decision circuit for deciding an error of the transformation image signal with reference to the to-be-coded region image signal, and a circuit for outputting, as a code, information on at least the to-be-transformed region and the transform method, which minimize the error decided by the decision circuit, and a mean value of the to-be-coded region.

According to this invention, there is also provided a decoder for receiving a code including information on at least a to-be-transformed region and a transform method which minimizes an error of a transformed image signal with reference to a to-be-coded image signal, the transformation image signal being obtained by subjecting a to-be-transformed image signal by means of a transform method designation signal, and a mean value of a to-be-coded region, thereby decoding an image, the decoder comprising: a memory for storing the code and outputting a to-be-coded region designation signal and a transformation method designation signal by means of a control signal; a memory for storing the to-be-transformed image signal and outputting, as the to-be-transformed region image signal, the transformed image signal within the to-be-transformed region designated by the to-be-transformed region designation signal; a transforming circuit for transforming the to-be-transformed image signal by means of the transform method designation signal and outputting the transformed image signal; and a circuit for correcting the transformed image signal on the basis of the mean value of the to-be-transformed region and outputting the corrected transformed image signal as a decoding signal.

According to the encoder and decoder of the present invention, a mean value of each of to-be-coded images, which are obtained by dividing an original image by a to-be-coded region designation signal in the decoder, is obtained. The mean value is encoded and supplied to the decoder along with the to-be-transformed region designating signal and a code signal of a transformed image signal. Since the code signal of the transformed image signal is decoded by the decoder, and a decoded image signal is corrected by the mean value, the decoded image is close to an original image by a small number of return times, and thus the number of arithmetic operations in the decoding mode can be reduced. In addition, since the shape of the to-be-coded image and that of the to-be-transformed image can be freely chosen by the to-be-coded region designation signal and the to-be-transformed region designation signal, the range of selection of the to-be-transformed region image and transform method is increased. As a result, a combination of the to-be-transformed image having high self-similarity to the to-be-coded image and the transform method having high transformation efficiency can be selected. Thus, the encoder with high coding efficiency can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and FIG. 3B show examples of image reduction transformation;;

FIG. 7 is a block diagram of an encoder according to a second embodiment of the invention;

FIG. 8 is a block diagram of an encoder according to a third embodiment of the invention;

FIG. 9 is a block diagram of an encoder according to a fourth embodiment of the invention;

FIG. 10 is a block diagram of an encoder according to a fifth embodiment of the invention;

FIG. 17 is a view for illustrating the advantage of the fifth embodiment;

FIG. 18 illustrates a method of selecting a to-be-transformed region and a transform method;

FIG. 19 illustrates another method of selecting a to-be-transformed region and a transform method;

FIG. 20 is a block diagram showing a transforming circuit of an encoder according to a sixth embodiment of the invention;

FIG. 21 shows the input order of to-be-transformed data;

FIG. 22 shows a pixel arrangement transforming circuit shown in FIG. 20;

FIG. 27 illustrates another method of designating an address;

FIG. 28 illustrates another method of designating an address;

FIG. 29 illustrates another method of designating an address;

FIG. 30 illustrates another method of designating an address;

FIG. 32 is a view for illustrating the form of a code word according to the seventh embodiment;

FIG. 33 shows an example of a transform method according to the seventh embodiment;

FIG. 34 shows an example of a transform method according to the seventh embodiment;

FIG. 35 shows an example of a transform method according to the seventh embodiment;

FIG. 36 shows an example of a transform method according to the seventh embodiment;

FIG. 37 shows an example of a transform method according to the seventh embodiment;

FIG. 38 is a view for illustrating a decoding method according to the seventh embodiment;

FIG. 39 is a view for illustrating a decoding method according to the seventh embodiment;

DETAILED DESCRIPTION OF THE PREFERRED EMBODIMENTS

Figure 1:
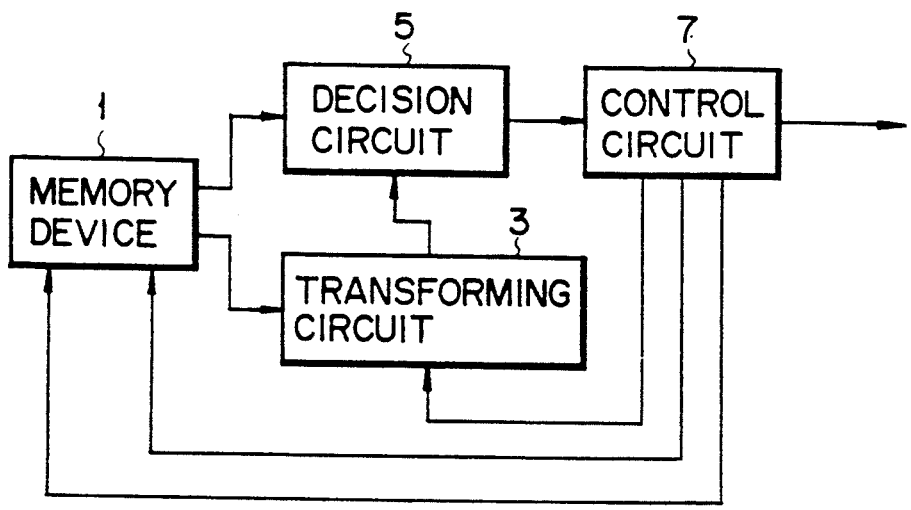
FIG. 1 is a block diagram of an encoder according to an embodiment of the present invention.

FIG. 1 shows an encoder for returned transformation encoding a static image, to which the present invention has been applied. The encoder comprises a memory device 1 for storing an original image, a transforming circuit 3 for transforming a to-be-transformed image in accordance with predetermined transform methods, a decision circuit for evaluating an error between a pixel value of the to-be-transformed image and a pixel value of a corresponding to-be-coded image, and a control circuit 7 for controlling the transforming circuit 3 and decision circuit 5 on the basis of the evaluation result obtained by the decision circuit 5.

Figure 2:
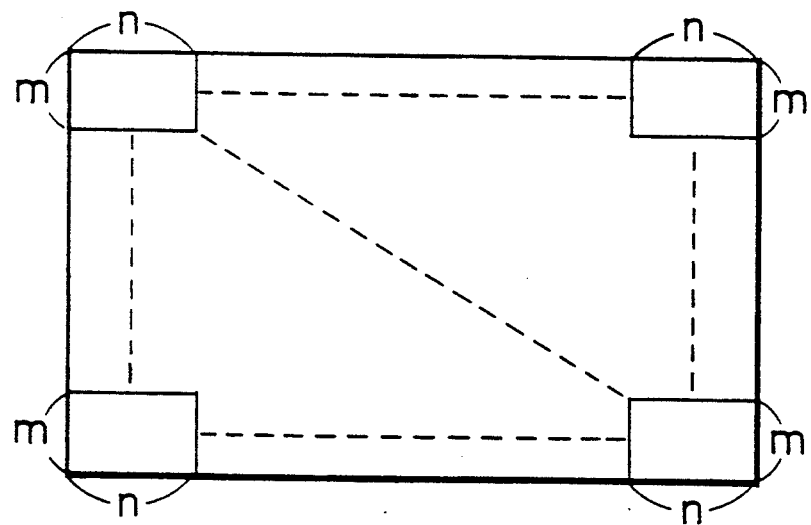
FIG. 2 shows a memory format of a memory device shown in FIG. 1.

The memory device 1 comprises a frame memory for storing the original image which is divided by a plurality of pixel blocks each having m × n pixels, as shown in FIG. 2. The memory device 1 receives a to-be-coded region designating signal from the control circuit 7, sending a to-be-coded image of m × n pixels to the decision circuit 5, receives a to-be-transformed image from the control circuit 7, and sending the to-be-transformed image to the transforming circuit 3.

The transforming circuit 3 transforms the to-be-transformed image in accordance with the transformation command from the control circuit 7. Thus, the circuit 3 produces a transformed image and sends it to the decision circuit 5. The transformation includes three transformations, i.e. pixel number transformation, pixel value transformation and pixel arrangement transformation.

In an example of pixel number transformation, M × N pixels of a to-be-transformed region are transformed into a reduced image of m × n pixels. Specifically, as shown in FIG. 3A, a to-be-transformed region is divided into small regions Di of M/m × N/n pixels, and a mean value of each of the small regions Di is set at a corresponding pixel value corresponding to a reduced image of m × n pixels. According to another method, a representative pixel value of each small region Di (e.g. a pixel value at a specified position of small region Di, or a pixel value providing a median) is set at a corresponding pixel value of a reduced image of m × n pixels. In addition, there is a method of transforming a rectangular to-be-transformed image of M × N into a square image of m × m, as shown in FIG. 3B. In this case, an average of M/m × N/n pixels of each of a plurality of rectangular divided to-be-transformed images obtained by dividing the rectangular original image of M × N is obtained. The mean value is assigned to a corresponding pixel position of a square to form a square transformed image. According to this method, to-be-transformed images of various shapes can be transformed into images of various shapes.

Figure 4:
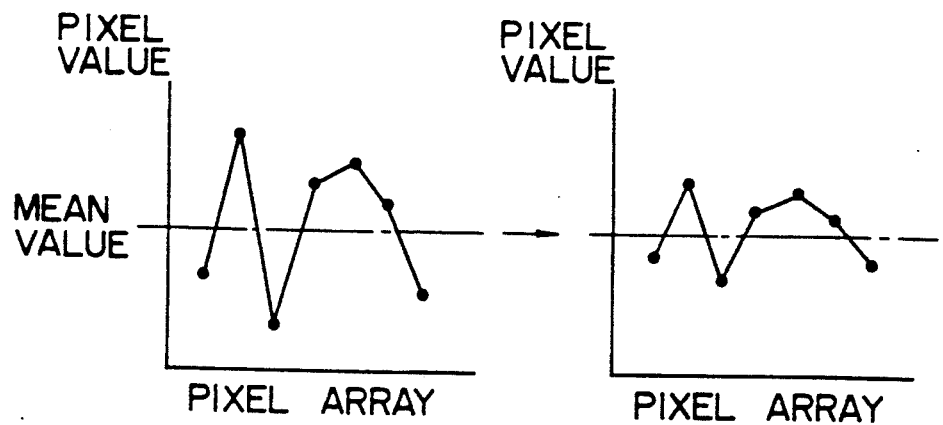
FIG. 4 shows an example of a pixel value transformation.
Figure 5:
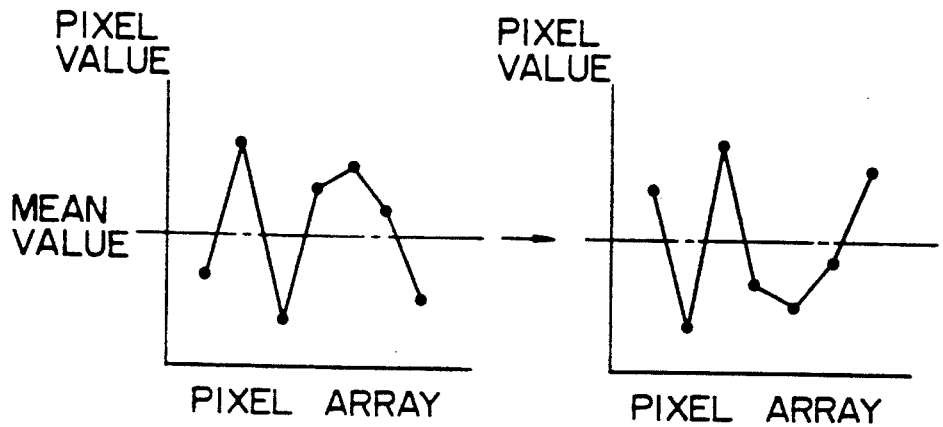
FIG. 5 shows another example of a pixel value transformation.

Examples of pixel value transformation are shown in FIGS. 4 and 5. In FIG. 4, pixel values of a small region are reduced to ½ with a mean value of these pixel values being set as a center. In FIG. 5, pixel values are inverted in respect of a center or a mean value of these pixel values. These two transformations, if treated as one and generalized, can be represented by the following transformation f:

$$f(g) = a \cdot (g - ga) + ga$$

where g = a pixel value, c = a constant, and ga = an average of pixel values.

Figure 6:
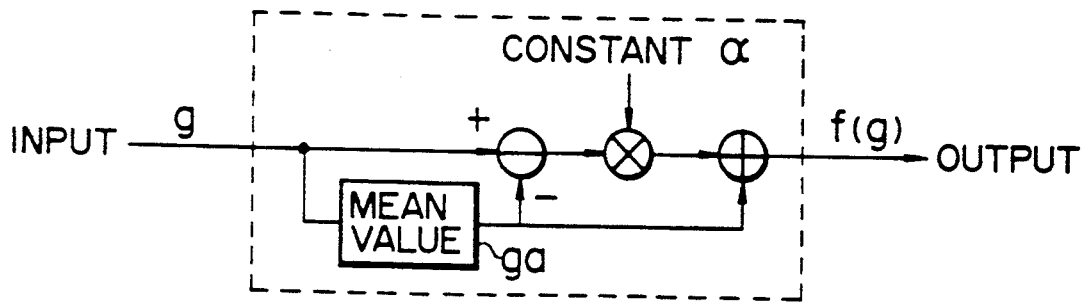
FIG. 6 is a block diagram of a pixel value transforming circuit for transforming a pixel value.

This transformation is performed by a circuit shown in FIG. 6.

Suppose that the transformation shown in FIG. 4 corresponds to $a = \frac{1}{2}$ and the transformation shown in FIG. 5 to $a = -1$. According to another example of pixel value transformation, an image curve plane of a to-be-transformed region is shifted towards pixel values so that the pixel mean value of a to-be-coded image coincides with that of a transformed image.

In examples of pixel arrangement transformation, a to-be-transformed image is rotated in units of 90°, or to-be-transformed images are exchanged in a line-symmetrical manner.

The decision circuit 5 evaluates an error between a to-be-coded image and a transformed image. That is, the decision circuit 5 finds an error between the pixel value of the to-be-coded image and that of the transformed image, and sends the result to the control circuit 7. For evaluation of error, a sum of square values of errors each between the pixel value of a to-be-coded image and that of a transformed image or an absolute value of an error between the pixel value of the to-be-coded image and that of the transformed image can be employed.

The control circuit 7, as will be described below, stores to-be-transformed region designating information for designating a to-be-transformed region corresponding to a to-be-transformed image of an image stored in the memory device 1, and transform method designation information for designating the method of transforming the to-be-transformed image. The control circuit 7 designates a to-be-transformed region and a transform method to the memory device 1 and transforming circuit 3 in order to select a combination of a new to-be-transformed image and a transform method. Thereafter, the control circuit 7 stores the result of an error decision made by the decision circuit 5. In this manner, the control circuit 7 sequentially designates a combination of the to-be-transformed image and the method of transformation and stores the results of error decision with respect to all combinations. The control circuit 7 outputs, as a code word, that combination of the to-be-transformed region and the transformation method, with which the error is smallest.

Then, the control circuit 7 designates a to-be-coded region designation and a to-be-transformed region to the memory device 1. After transformation designation was made for the transforming circuit 3, the control circuit 7 transmits, as a code word, that combination of the to-be-transformed image and the transform method, with which the error is smallest in relation to a new to-be-coded region, in a similar manner with the previous to-be-coded image. In this way, to-be-coded images of one frame are sequentially converted to coding words in a prescribed order. By transmitting the coding words, the original image of one frame is encoded.

In this returned transformation encoder, a rectangular region of m × n pixels is used as a to-be-coded region and a rectangular region of M × N pixels is used as a to-be-transformed region. Consequently, the number of combinations of to-be-coded regions and to-be-transformed regions is greater than in the prior art. Thus, with respect to each to-be-coded image, an image being close to the to-be-coded image and having high self-similarity can be adopted as a to-be-transformed image. Therefore, by transforming this to-be-transformed image, the transformed image close to the to-be-coded image can be obtained. In addition, since the number of transform methods is increased, the transformed image close to the to-be-coded image can be obtained.

FIG. 7 is a block diagram of an encoder according to another embodiment of the invention. The structural elements corresponding to those shown in FIG. 1 are denoted by like reference numerals, and detailed description thereof is omitted.

According to this embodiment, read-out terminals of a memory device 1 are connected to input terminals of a mean value calculator 9a for calculating a mean value of pixel values of a to-be-coded image, a transforming circuit 3 and a decision circuit 5. The calculation result of the calculator 9a is supplied to one input terminal of an adder 11. An output terminal of the adder 11 is connected to an input terminal of the decision circuit 5. An output terminal of the decision circuit 5 is connected to an input terminal of a control circuit 7. The control circuit 7 outputs to-be-coded region designation information, to-be-transformed region designation information and transform method information to the memory device 1 and transforming circuit 3.

A subtracter 13 is connected between the other input terminal of the adder 11 and an output terminal of the transforming circuit 3. A mean value calculator 9b for calculating an average of pixel values of a transformation image is connected between the output terminal of the transforming circuit 3 and an input terminal of the subtracter 13. The subtracter 13 subtracts the calculation result of the mean value calculator 9b from the transformation image input from the transforming circuit 3. More specifically, the subtracter 13 subtracts the average of pixel values of the transformation image from the transformation image, and outputs the subtraction result to the other input terminal of the adder 11.

With the encoder having the above structure, the same advantage as in the previously described encoder can, of course, be obtained. According to the encoder of this embodiment, the average of pixel values of a transformed image is subtracted from the transformed image, a value obtained by adding the average of pixel values of the to-be-coded image to the subtraction result is compared with the to-be-coded image, and the to-be-transformed region and transform method, with which the error between the to-be-coded image and the transformed image is reduced at a smallest value, are converted to code words. Thus, a decoded image decoded by the code word and the original image have the same average of pixel values in the same to-be-coded region, and therefore the S/N is improved. According to this encoder, since the mean value of the pixels of the decoded image coincides with the mean value of the original image despite of the transformation by means of the transforming circuit 3, there is no need to incorporate information relating to shift transformation to the code word. Thus, the amount of codes which corresponds to the information decreases, and, since the pixel mean values of the respective regions which are included in the code word have a high correlativity, further compression is possible by means of predictive coding, etc. The coding efficiency is thus enhanced.

Referring to FIG. 8, an encoder according to a third embodiment will now be described. The same structural elements corresponding to those of the second embodiment of FIG. 7 are denoted by like reference numerals, and detailed description thereof is omitted.

According to the third embodiment, a subtracter 13a is provided between a memory device 1 and a decision circuit 5, and a transforming circuit 3a controlled by a control circuit 7 is provided between a subtracter 13b and the decision circuit 5. One input terminal of the subtracter 13a is supplied with a to-be-coded image stored in the memory device 1, and the other input terminal is supplied with a calculation result from a mean value calculator 9a. The subtracter 13a supplies to the decision circuit 5 a subtraction result obtained by subtracting the mean value of pixel values of a to-be-coded image from the to-be-coded image.

According to this encoder with the above structure, both the mean values of pixel values of the to-be-coded image and transformed image are set at zero. Thus, a decoded image decoded by coding words obtained by the encoder and an original image from which the pixel mean value of the decoded image is subtracted have the same pixel mean value (=0) at every to-be-coded region. Thus, the same advantage as in the second embodiment can be obtained.

FIG. 9 is a block diagram of an encoder according to a fourth embodiment of the invention. The structural elements corresponding to those in the third embodiment of FIG. 8 are denoted by like reference numerals, and detailed description thereof is omitted.

According to the fourth embodiment, one input terminal of a deviation ratio calculator 9c is supplied with a subtraction result of a subtracter 13a, and the other input terminal is supplied with a subtraction result of a subtracter 13b. From these subtraction results, the deviation ratio calculator 9c calculates a ratio of a standard pixel value deviation of a to-be-coded image to a standard pixel value deviation of a transformed image. The third embodiment further includes a multiplier 15 provided between the subtracter 13b and a transforming circuit 3a. One input terminal of the multiplier 15 is supplied with a subtraction result of the subtracter 13b, and the other input terminal is supplied with a calculation result of the deviation ratio calculator 9c. The multiplier 15 supplies a multiplication result to the transforming circuit 3a.

In the encoder having the above structure, too, the pixel mean values of the to-be-coded image and to-be-transformed image coincide, and the same advantage as in the third embodiment can, of course, be obtained. In this case, the standard pixel value deviations of the to-be-coded region and to-be-transformed region are also coincident. Thus, by using the coding words obtained by this encoder, the decoded image can be converged to the original image with a less number of returned transformations.

FIG. 10 is a block diagram of an encoder according to a fifth embodiment of the invention. The structural elements corresponding to those in the fourth embodiment of FIG. 9 are denoted by like reference numerals, and detailed description thereof is omitted.

According to this encoder, a control circuit 7 is controlled by the control circuit 7. The control circuit 7 is connected to a to-be-coded region address generator 17 and a to-be-coded region address generator 19 for outputting an address signal 13 and an address signal 14 for designating addresses in a frame memory in a memory device 1 at a predetermined timing. A selector 21 is controlled by a control signal 12 from the control circuit 7 to transmit one of output signals of the address generators 17 and 19 to an address terminal of the frame memory in the memory device 1. A data I/O terminal of the frame memory of memory device 1 is connected to a transforming circuit 3b. The transforming circuit 3b is controlled by the control circuit 7, thereby subjecting to-be-transformed data read out from the frame memory to predetermined transformation and sending the transformed result to one input terminal of a subtracter 13b controlled by the control circuit 7. The data I/O terminal of the frame memory is connected to a memory 23. The memory 23 stores to-be-coded region data read out from the frame memory of the memory device 1, and transfers the stored data to the other input terminal of the adder 13b.

Figure 11:
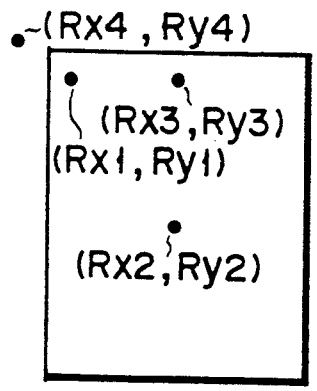
FIG. 11 is a view for illustrating the content of information of a to-be-coded region designating signal according to the fifth embodiment.

According to the encoder with the above structure, the control circuit 7 supplies a to-be-coded region designation signal 11 to the to-be-coded region address generator 17, thus designating a first to-be-coded region, and also supplies a selector control signal 12 to the selector 21, thus selecting the address signal 13 from the to-be-coded address generator 17. The to-be-coded region designation signal 11 contains information for designating coordinates (to-be-coded region representative coordinates (Rx, Ry)) of a pixel at a specified position in a predetermined to-be-coded region, for example, as shown in FIG. 11, an upper left corner (Vx1, Vy1) of an original image, a center (Vx2, Vy2), an upper center (Vx3, Vy3), or a point (Vx4, Vy4) situated outside of the upper left corner by one pixel. The size of the to-be-coded region is predetermined to be constant. Thereby, a to-be-coded region address of the frame memory is designated by the address signal 13, and to-be-coded region data is sent from the data I/O terminal of the frame memory to the memory 23. The memory 23 stores the to-be-coded region data and sends the data to one input terminal of the subtracter 13b.

Figure 12:
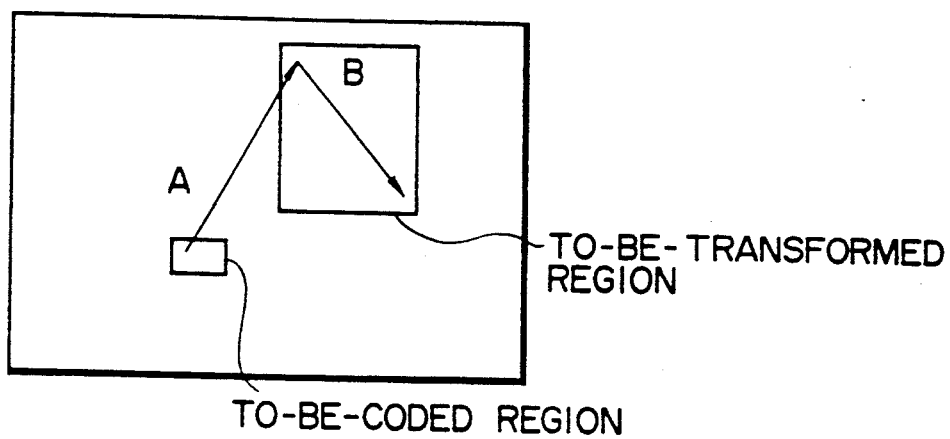
FIG. 12 is a view for illustrating the content of information of a to-be-transformed region designating signal according to the fifth embodiment.

Subsequently, the control circuit 7 sends the control signal 12 to the selector 21 for selecting the address signal 14 of the to-be-transformed region address generator 19. Then, the control circuit 7 supplies the to-be-transformed region designation signal 15 and transform method designating signal 16 for designating the transform method, respectively, to the to-be-transformed region address generator 19 and the transforming circuit 3b, thereby sequentially determining to-be-transformed regions and transform methods. As is shown in FIG. 12, the to-be-transformed region designation signal 15, as shown in FIG. 12, contains information on a vector A (Ax, Ay) and a vector B (Bx, By). The vector A (Ax, Ay) is a position vector of to-be-transformed region representative coordinates corresponding to to-be-coded representative coordinates, and the vector B (Bx, By) is a position vector of a pixel which is most diagonal to the to-be-transformed region representative coordinates within the to-be-transformed region corresponding to the to-be-transformed region representative coordinates.

Figure 13:
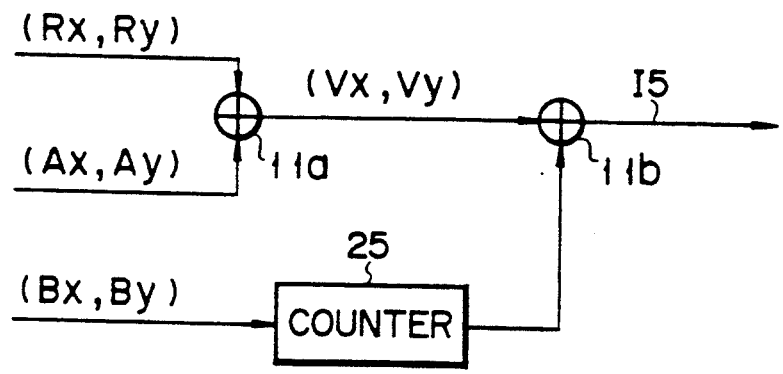
FIG. 13 shows the structure of a to-be-transformed region address generator according to the fifth embodiment.
Figure 14:
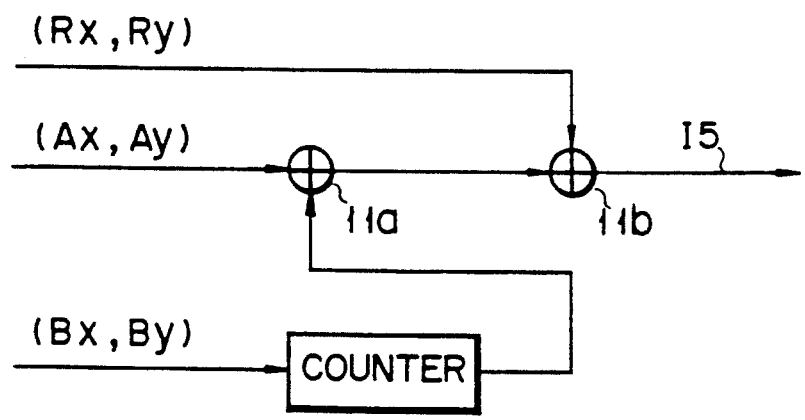
FIG. 14 shows the structure of a to-be-transformed region address generator according to the fifth embodiment.

FIG. 13 shows a structure of the to-be-transformed region address generator 19 capable of outputting the to-be-transformed region designation signal 15. In the address generator 19, an adder 11a adds to-be-coded region representative coordinates (Rx, Ry) to a position vector A (Ax, Ay), thus producing to-be-transformed region representative coordinates (Vx, Vy). These coordinates (Vx, Vy) are added, by an adder 11b, to a position vector B (Bx, By) which has been shifted, via a counter 25, in an x-direction (horizontal direction of a to-be-transformed region in FIG. 12) in every Bx pixels and in a y-direction (vertical direction of the to-be-transformed region in FIG. 12) in every By pixels. Thereby, the to-be-transformed region designation signal 15 is obtained. In this case, it suffices, finally, to sum the to-be-coded region representative coordinates (Rx, Ry), position vector (Ax, Ay) and the output from the counter 25. Thus, the to-be-transformed region address generator 19 can be constituted, as shown in FIG. 14.

Figure 15:
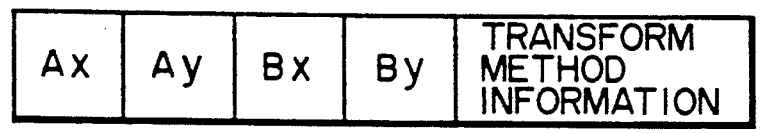
FIG. 15 shows a form of a code employed in the fifth embodiment.

Subsequently, the address signal 14 designates the to-be-transformed address of the frame memory, and the to-be-transformed region data is sent from the data I/O terminal to the transforming circuit 3b. The transforming circuit 3b subjects the to-be-transformed data to transformation to produce transformed data, and supplying the transformed data to the other input terminal of the subtracter 13b. The subtracter 13b sends to the control circuit 7 an error signal Ie corresponding to the difference between the transformed data and to-be-transformed data. The control circuit 7 selects that combination of the determined to-be-transformed region and the transform method, with which the error signal Ie is minimized, and outputs a code of a format shown in FIG. 15. Thereafter, the second and following to-be-coded regions are sequentially encoded, like the first to-be-coded region, whereby the encoding of the original image is completed.

Figure 16:
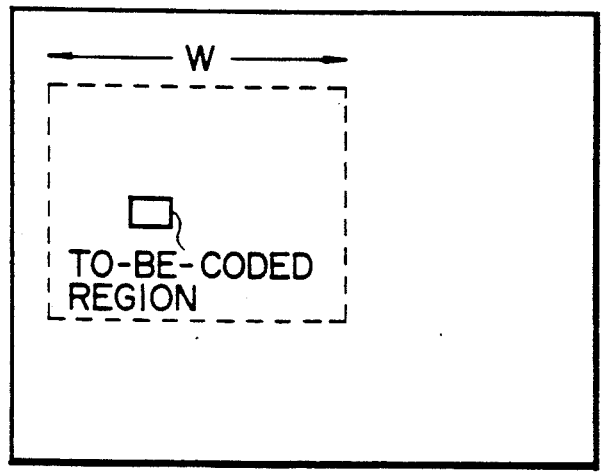
FIG. 16 is a view for illustrating the advantage of the fifth embodiment.
Figure 23:
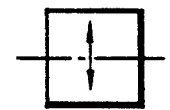
FIG. 23 shows a method of designating an address according to the circuit of FIG. 22.
Figure 24:
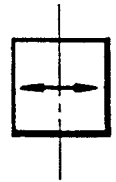
FIG. 24 shows another method of designating an address.
Figure 25:
FIG. 25 illustrates another method of designating an address.
Figure 26:
FIG. 26 illustrates another method of designating an address.

Regarding the encoder, attention was paid to the fact that self-similarity increases in a region of the same image quality, and the to-be-transformed region representative coordinates are expressed by a position vector corresponding to to-be-coded region representative coordinates, thereby reducing to-be-transformed region information. Specifically, as shown in FIG. 16, since a to-be-coded region has a candidate for a to-be-transformed region in the vicinity of the to-be-coded region (enclosed by a broken line), the horizontal (x)-directional information of the to-be-transformed region can be expressed by the number of bits corresponding to the width W. Since the amount of codes can be reduced without eliminating other information, the degradation of image quality can be prevented. Suppose, however, the case where the absolute coordinates (Xi, Yi) of a pixel at a corner of a to-be-transformed region and the absolute coordinates (Xf, Yf) of a pixel at a position diagonal to the absolute coordinates (Xi, Yi) are used as to-be-transformed representative coordinates. In this case, the dynamic range of Xi, i.e. The range of values of Xi, extends fully in the lateral direction of the frame. Thus, to express Xi, many bits are required. For example, when the lateral width corresponds to 256 pixels, 8 bits are required. In addition, the same number of pits are required to express Yi, Xf and Yf.

Further, in the present encoder, data can be further compressed by a variable length coding using a deviation of distribution of vectors A and B.

There is a method to be substituted for the method of selecting the combination of a to-be-transformed region and a transform method, which minimizes the error signal Ie. According to this method, as shown in FIG. 18, to-be-transformed representative coordinates (Vx, Vy) are gradually increased from the vicinity of a to-be-coded region, that is, the norm of a position vector A is gradually increased from a small value. Then, the value of error signal Ie of each norm is compared with a value within a predetermined value. If the value of error signal Ie falls within the range, the to-be-transformed region and the transform method at this time are adopted as codes. This method is advantageous in that the position vector is deviated to a smaller value. Similarly, if the norm of the position vector B is gradually increased, as shown in FIG. 19, and the error signal Ie is sequentially obtained, the deviation can be increased. The increasing of deviation of distribution improves efficiency of the variable length coding.

The transforming circuit relating to the present encoder will now be described.

The transforming circuit, as shown in FIG. 20, comprises a pixel number transforming circuit 4a, a pixel value transforming circuit 4b and pixel arrangement transforming circuit 4c. Transformation methods for the pixel value transforming circuit 4b and pixel arrangement transforming circuit 4c are designated by a transform method parameter 110 from the control circuit 7. In this embodiment, since the pixel number of the to-be-coded region is preset, there is no need to indicate the transform method for the pixel number transforming circuit 4a.

The pixel data 189 is changed to pixel data 19a through the transformation circuits 4a and 4b. Since the pixel data 19a is passed through the pixel value transforming circuit 4b, the number of data units is equal to the number of pixels of the present to-be-coded region block. As shown in FIG. 21, the pixel data 19a is input to the pixel arrangement transforming circuit 4c in the order of numbers from the upper left pixel of the block. The pixel arrangement transforming circuit 4C comprises a block memory 4C1 and a memory 4C2, as shown in FIG. 22. The pixel data 19a is written in the block memory 4C1 in units of a block. The address at which the pixel data 19a is written is designated by the address data stored in the memory 4C2. Specifically, the addresses in the memory 4C2 are designated in orders of different patterns, as shown in FIGS. 23 to 30, by mode signals of the transformation method parameter 110. In each figure, numbers of addresses output from the memory 4C2, an exchange pattern and the number of a mode signal are shown in an order from the left. For example, a pattern corresponding to the mode signal=1 is a pattern in which pixels are vertically exchanged in a line-symmetrical manner. In order to realize the pattern, the addresses are designated in the block memory 4C1 successively from the lower left address in the block. When pixel arrangement transformation is not carried out, a mode signal=0 is sent to the memory 4C2 and addresses are designated in the same order as the input pixel data 19, as shown in FIG. 30. The patterns shown in FIGS. 24 to 29 are respectively: exchange in respect of a vertical line; left rotation by 90 ; rotation by 180°; exchange in respect of a slanting line; shift of the leftmost one column to the rightmost; and left rotation by 90° of only 3×3 pixels. Since the result of the pixel arrangement transformation is retained in the block memory 4C1, data is read out from the upper left pixel by supplying the memory mode signal=0 at the time of output, and transformation pixel data 111 is obtained. Even if the mode signal=0 is supplied, inversely, at the time of input and data is retained in the block memory 4C1 in a pre-transformation arrangement transformation and the mode signal of the present transformation method is supplied at the time of output, the same transformation pixel data 111 is obtained.

In this embodiment, the output of the memory 4C2 for pre-storing a plurality of transformation method patterns is connected to the block memory 4C1. By designating the transformation method by means of the mode signal, the pixel arrangement transformation is performed. Thus, a small-sized, general-purpose transforming circuit including a pixel arrangement transforming circuit can be obtained.

Figure 31:
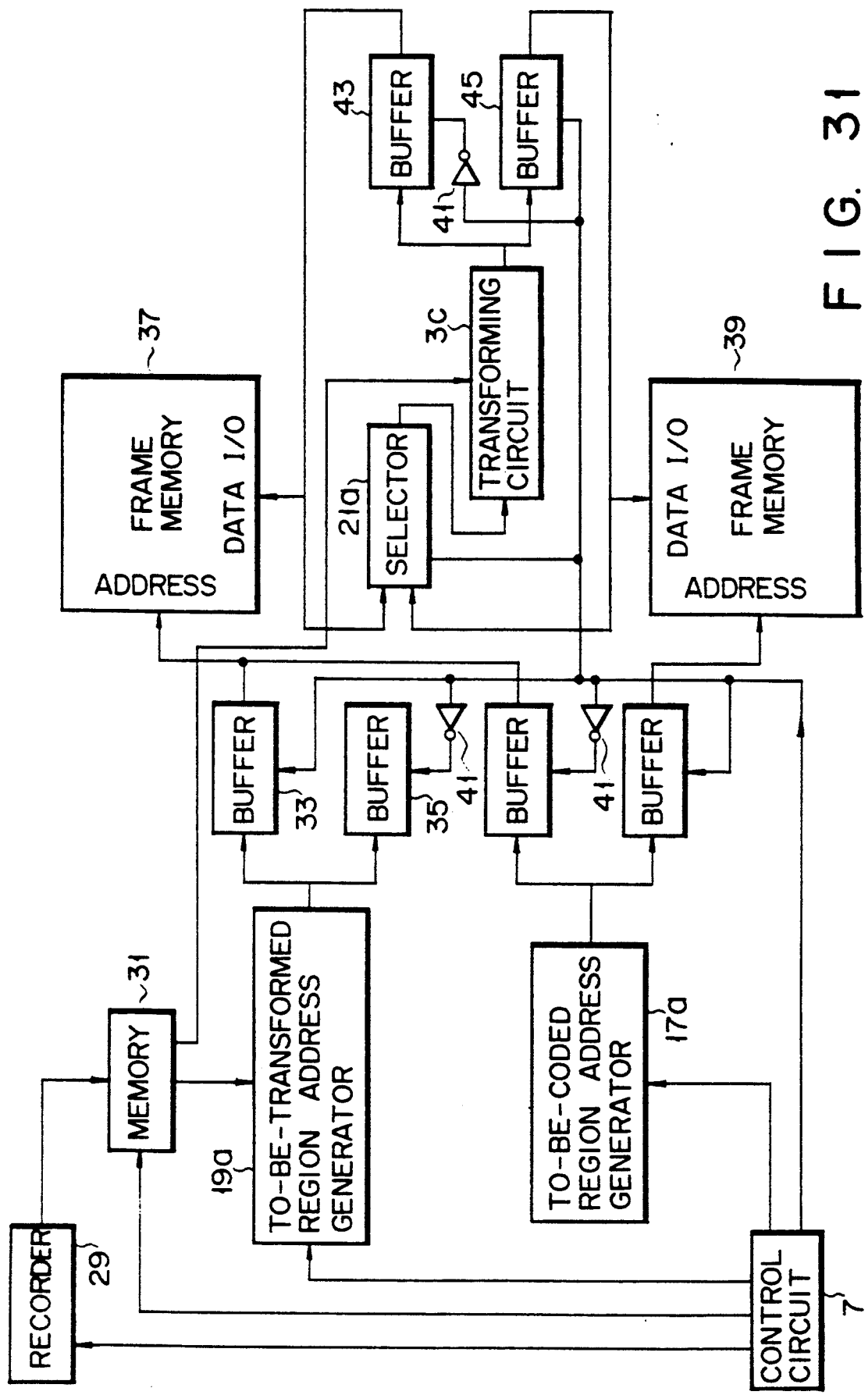
FIG. 31 is a block diagram of a decoder according to a seventh embodiment of the present invention.

FIG. 31 is a block diagram of a decoder according to a seventh embodiment of the invention.

This encoder is an apparatus for decoding returned transformation-coded code words of one or more frames stored in a storage device 29 including a storage medium such as an optical disc, a magnetic tape or floppy disc. According to this decoder, a control circuit 7 is connected to the storage device 29, memory 31, to-be-transformed region address generator 19a and to-be-transformed region address generator 17a. Transformation information of one frame is read out from the storage device by an instruction from the control circuit 7, and the read-out information is stored in the memory 31. At this time, if the returned transformation-coded code word has been subjected to other coding, e.g. variable-length coding, the decoded information is written in the memory 31 by the control of the control circuit 7. If there is a room in the capacity of the memory 31, code words of two frames or more may be written in the memory 31. A code word includes, in general, information on a transformation method, to-be-transformed region and to-be-coded region. However, the code word used in the present embodiment is produced by the above-described encoder, the code word does not include information on the to-be-coded region. Specifically, as shown in FIG. 32, the information on the transform method and to-be-transformed region is sequential from the upper left to-be-coded region of the first line of the frame to the right to-be-coded region of the same line, and then to the next line.

The control circuit 7 issues a command to transfer the information on the to-be-transformed region associated with the first to-be-coded region and transform method stored in the memory 31 to the to-be-transformed region address generator 19a and transforming circuit 3c. The to-be-transformed region address generator 19a sends the information of the to-be-transformed region address to 3-state buffers 33 and 35 at the timing determined by the control circuit 7. The 3-state buffers 33 and 35 are connected to an address bus of frame memories 37 and 39.

Then, the control circuit 7 supplies low-level signals to the 3-state buffers 33 and 35. At this time, the level of the signal input to the 3-state buffer 35 is inverted by an inverter 41 at the input stage, the output of the 3-state buffer 35 has a high impedance. In other words, to-be-transformed address information of the 3-state buffer 33 is input to the frame memory 37 whereby the frame memory 37 is designated by a to-be-transformed region address. Subsequently, pixel value data of the to-be-transformed region is sent to the selector 21a via a data I/O terminal of the frame memory 37. The selector 21a is also connected to a data I/O terminal of the frame memory 39, but pixel value data of the frame memory 37 is not supplied to the selector 21a by the instruction from the control circuit 7. Then, the selector 21a supplies the pixel value data of the to-be-transformed region from the frame memory 37 to the transforming circuit 3c. According to the transformation method designated by the information read out from the memory 31, the transforming circuit 3c converts the pixel value data, and sends the result to the 3-state buffers 43 and 35. Regarding the 3-state buffers 43 and 45, only the 3-state buffer 45 is enabled for the same reason as with the 3-state buffers 33 and 35. Accordingly, the transformed result of the transforming circuit 3c is stored in the 3-state buffer 45.

In addition to the above examples of transformation, FIGS. 33 and 34 show other examples. In the example of FIG. 33, the upper half and lower half of an image are exchanged. In FIG. 34, only the upper half is rotated clockwise by 90°. For example, as shown in FIG. 35, the pixel values are reduced with reference to the zero level. Alternatively, as shown in FIG. 36, the pixel values are inverted in respect to the mean value, or, as shown in FIG. 37, the shift amount is increased towards the right.

When the transformation of one frame has been finished, the same transformation is repeated from the first to-be-transformed region of the same frame. In this case, as shown in FIG. 39, the pixel value of the designated to-be-transformed region C1 is extracted from the frame memory 39, and the transformed result is written in the frame memory 37. This operation is carried out by sending high-level signals from the control circuit 7 to the 3-state buffers 33, 35, 43, 45, 47 and 49 and the transforming circuit 3c. Thereafter, the operations shown in FIGS. 38 and 39 are repeated alternately, and repeat transformation is carried out. An image stored in the frame memory 37 or 39, which is obtained after a predetermined number of times of repeat conversions, is output as a decoded image. Instead of carrying out a predetermined number of times of returned transformations, it is possible to carry out returned transformations until the difference between the pixel values of the frame memories 37 and 39 decreases to a predetermined value or less, thereby using the obtained image as a decoded image.

Figure 40:
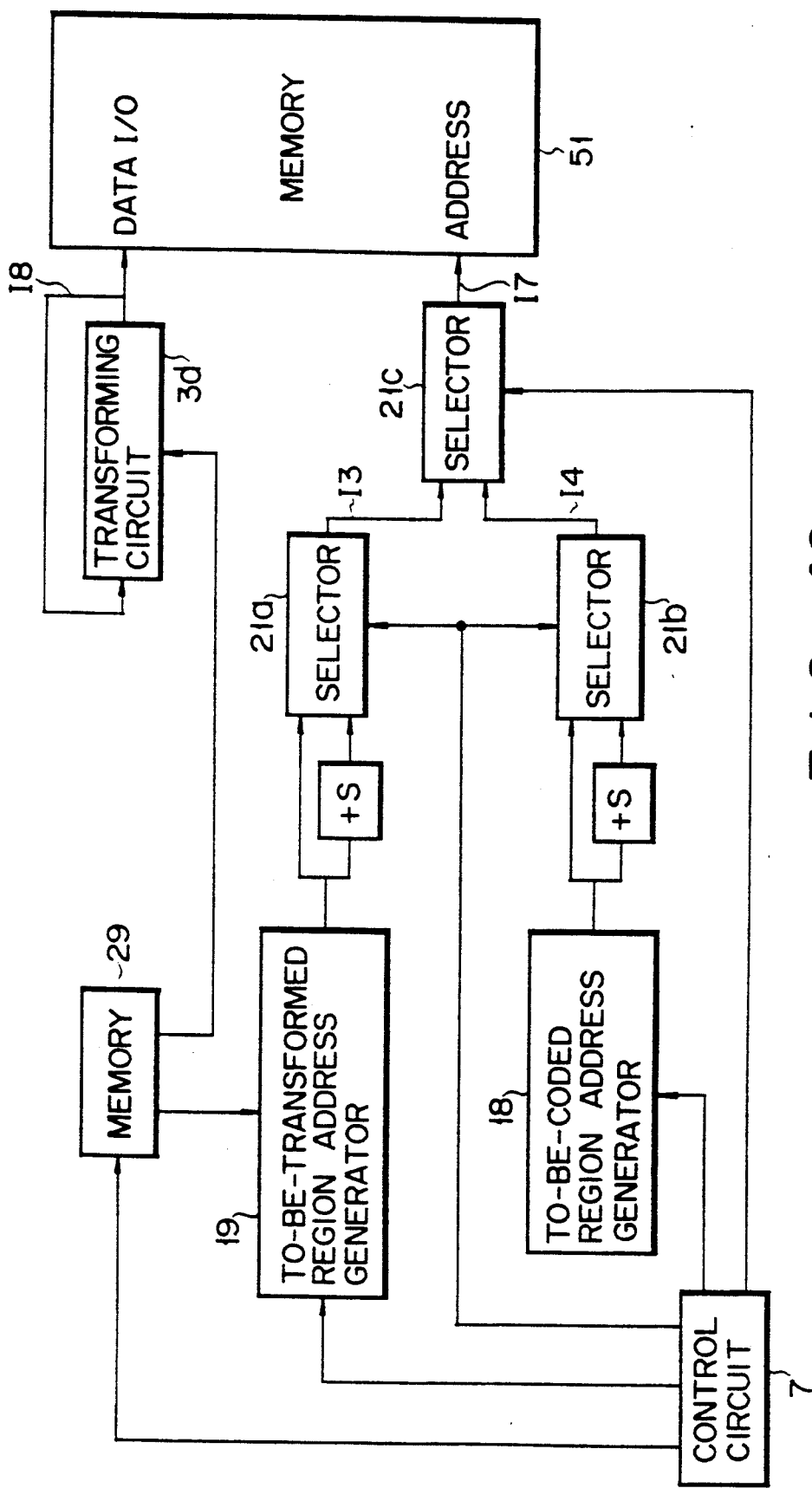
FIG. 40 is a block diagram showing a decoder according to an eighth embodiment of the invention.

FIG. 40 is a block diagram of a decoder according to an eighth embodiment of the invention. The structural elements corresponding to those in the sixth embodiment of FIG. 31 are denoted by like reference numerals, and detailed description thereof is omitted.

According to the decoder according to this embodiment, unlike the decoder of the sixth embodiment, one memory 51 has two portions for two frames.

Figure 41:
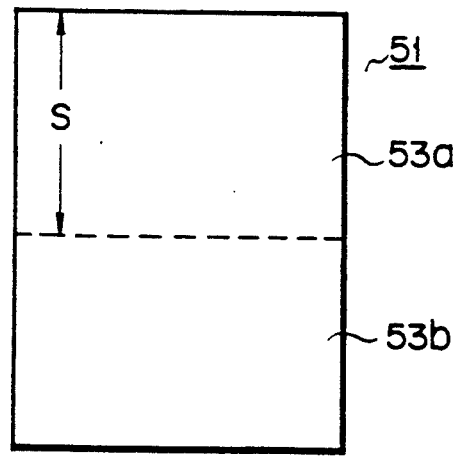
FIG. 41 is a view for illustrating a memory for decoding according to the eighth embodiment.

The memory 51, as shown in FIG. 41, is divided into a memory portion 53a with a height S corresponding imaginarily to the frame memory 37, and a memory portion 53b corresponding to the frame memory 39. A selector 21a receives an address of a to-be-transformed region shifted by the height S and an address of a to-be-coded region which is not shifted. The selector 21a is controlled by a control circuit 7 to send one of the addresses, as an address signal 13 of the to-be-coded region, to a selector 21c. Similarly, a selector 21b receives an address of a to-be-coded region shifted and an address of a to-be-coded region which is not shifted. The selector 21b is controlled by a control circuit 7 to send one of the addresses, as an address signal 14 of the to-be-coded region, to a selector 21c. The selector 21c is controlled by the control circuit 21c to send one of the address signals 13 and 14 to a memory 51.

According to the decoder with the above structure, an address which has not been shifted by the control circuit 7 is selected as the address signal 13 of the to-be-transformed region, and the shifted address is selected as the address signal 14 of the to-be-coded region. Thereby, the memory portion 53a is used for the to-be-transformed region, and the memory portion 53b is used for the to-be-coded region. Subsequently, data of the to-be-transformed regions is read out from the memory portion 53a sequentially from the data of the first to-be-transformed region, and the read-out data is sent directly to a transforming circuit 3d via a data bus 18. The transformation result is sequentially written in the memory portion 53b via the data bus 18. Similarly to the preceding embodiment, when the transformation of one frame is completed, the address shifted by the control circuit 7 is selected as the address 13 of the to-be-transformed region and the address not shifted is selected as the address signal 14 of the to-be-coded region. Thereby, the memory portion 53a is used for to-be-coded regions, and the memory portion 53b for to-be-transformed regions. Then, the same transformation is carried out from the first to-be-transformed region. Thereafter, like in the preceding embodiment, the transformation is repeated to obtain a decoded image. In this way, since only one memory is used in this embodiment, a small-sized decoder is obtained.

Figure 42:
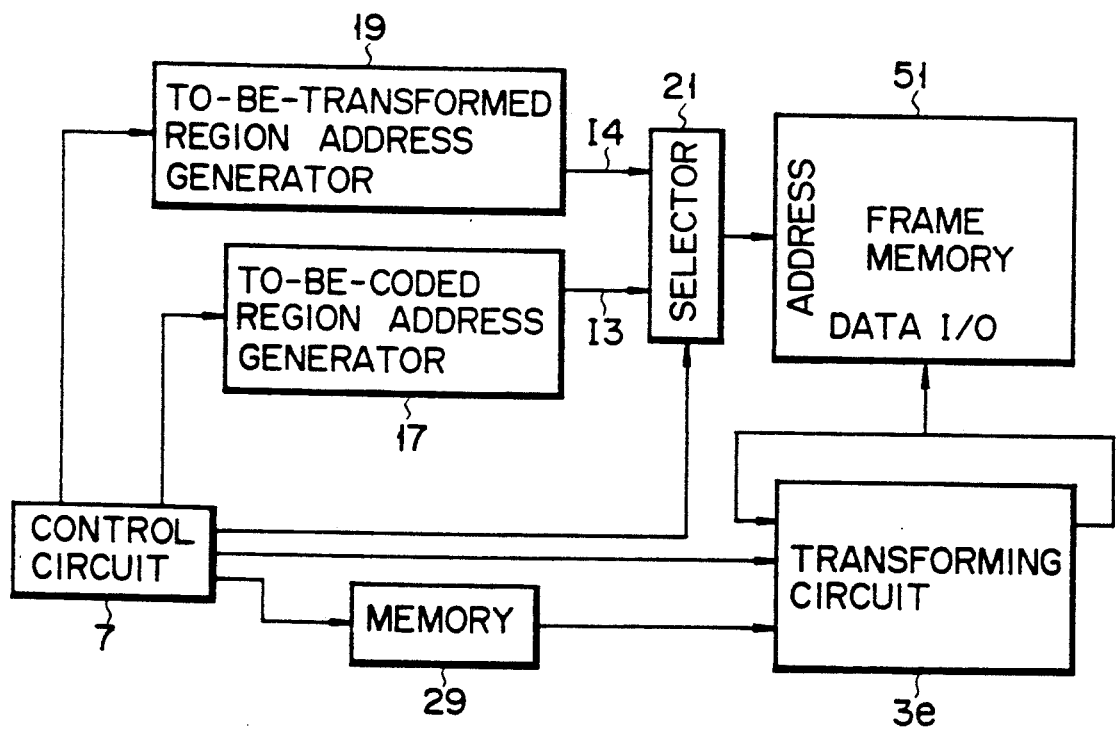
FIG. 42 is a block diagram of a decoder according to a ninth embodiment of the invention.

FIG. 42 is a block diagram of a decoder according to a ninth embodiment of the invention.

In the preceding embodiment, two frame memories are employed, whereas only one frame memory is employed in this embodiment.

Specifically, in this embodiment, a selector 21 receives outputs from a to-be-coded region address generator 17 and a to-be-transformed region address generator 19. By operation of a control circuit 7, one of the outputs from the address generators 17 and 19 is selected by the selector 21 at a predetermined timing. when the control circuit 7 controls the to-be-transformed region address generator 19, a to-be-transformed region pixel value designated by an address from the address generator 19 is read out from a frame memory 51 via a data I/O. Then, when the pixel value of the to-be-transformed region is sent to a transforming circuit 3e, the transforming circuit 3e converts the to-be-transformed region pixel value according to the information relating to the to-be-transformed region of each to-be-coded region block and transformation method therefor, which information is sent from the memory 31. The transformation result is written at an address in the frame memory 51 designated by address information from the address generator 17 selected by the control circuit 7. In this case, since the converted pixel value is included in the information of the to-be-transformed region, the process of convergence of transformation image differs from the processes of the two decoders according to the preceding embodiments. However, it was confirmed by the inventor that the decoded image is identical to the decoded images obtained in the preceding embodiments. Since the structure of the decoder according to this embodiment is simplified, as stated above, a small-sized decoder is obtained.

Figure 43:
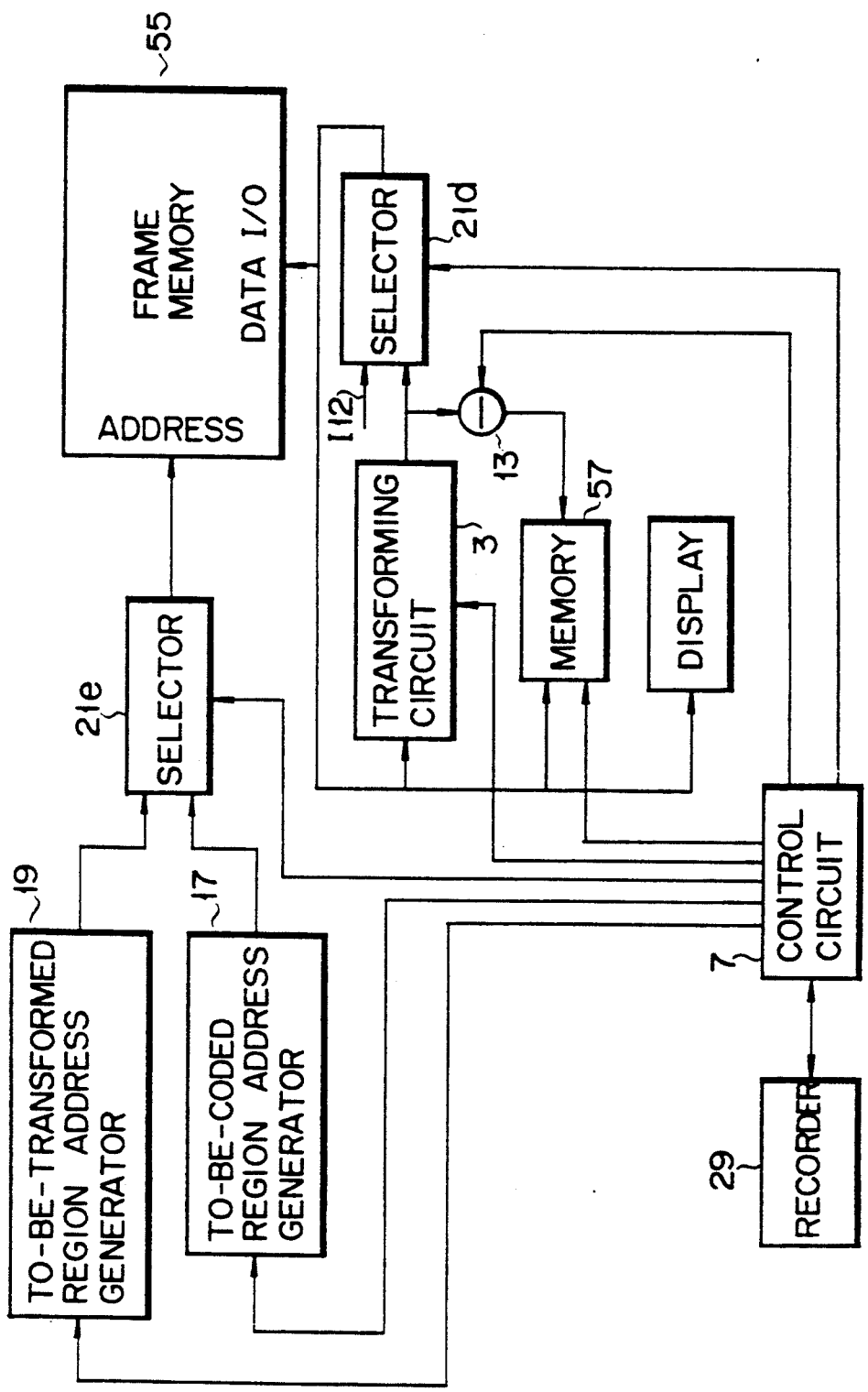
FIG. 43 is a block diagram showing a decoder according to a tenth embodiment of the invention.

FIG. 43 is a block diagram of a encoder/decoder according to a tenth embodiment of the invention. This device can perform both encoding and decoding.

In the encoding mode, original image data 112 is selected by a selector 112 and stored in a frame memory 55. In this case, an original image address generator may be used for address designation, separately from the to-be-coded region address generator 17 and to-be-transformed region address generator 19; however, in this embodiment, address information from the to-be-coded address generator 17 is employed. In this case, however, it is necessary to provide the to-be-coded region address generator 17 with a mode for generating an address matching the original image data. Of course, the to-be-transformed address generator 19 may be substituted for the to-be-coded region address generator 17. Whichever address generator is employed, switching of the selectors 21d and 21e is not effected during write-in of the original image data 112.

Subsequently, the output impedance of the selector 21d is raised and the selector 21d is set in the state for obtaining a code. Then, the control circuit 7 sends an instruction to the to-be-coded region address generator 17 to generate an address corresponding to the first to-be-coded region, and also sends instructions to the address generator 17 and selector 21e so that the selector 21e selects the output of the to-be-coded region address generator 17. Thereby, the frame memory 55 is designated by the to-be-coded region address, and the to-be-coded region data is input to the memory 57 via the data I/O. At this time, the to-be-coded region data is written in the memory 57 at a timing determined by the control circuit 7. Thereafter, the control circuit 7 sends an instruction to the selector 21 to select the output of the to-be-transformed region address generator 17 and also sends instructions regarding the to-be-transformed region and transformation method to the to-be-transformed region address generator 19 and transforming circuit 3. Thus, a to-be-transformed address is set in the frame memory 55 and the to-be-transformed region data is input to the transforming circuit 3 via the data I/O. Then, the transformation data or the transformation result of the transforming circuit 3 and the to-be-coded region data stored in the memory 57 are input to a subtracter 13, and a signal corresponding to a difference between these data is sent to the control circuit 7. The control circuit 7 selects such a combination of the to-be-transformed region and transformation method as to minimize the difference between the transformation data and the to-be-coded region data. The selected combination is held, as a code, in a storage medium in the storage device 29. A code is found similarly with respect to the second and following to-be-coded regions. Codes 9 of all to-be-coded regions are held in the storage medium of the storage device 29, and thus the coding of one frame is completed.

In the decoding mode, a code is read out by the control circuit 7 from the storage device 29. The control circuit 7 indicates a to-be-transformed region to the to-be-transformed region address generator 19 on the basis of the information of the first to-be-transformed region for transformation included in the code. At the same time, the control circuit 7 instructs the selector 21 to select the output from the address generator 19. Thereby, the frame memory 55 is designated by the address of the to-be-transformed region. Then, the data of the to-be-transformed region from the frame memory 55 is input to the transforming circuit 3 and converted to transformation data. In the case of this transformation, the control circuit 7 reads out from the storage medium 29 the first transformation method included in the code and thereafter sends the transformation method to the transforming circuit 3. The control circuit 7 then instructs the to-be-coded transformation address generator 17 to set the first to-be-coded region address, instructs the selector 21e to select the output from the to-be-coded region transformation address generator 17, and instructs the selector 21d to select the transformation data.

Then, the exchange of transformation data relating to the second and following to-be-coded regions is carried out. When exchange of data of all to-be-coded regions is completed, exchange of data is repeated from the data relating to the first to-be-coded region. After a predetermined number of times of repeating is completed, the data in the frame memory 55 at this time is recognized as a repeat image. Similarly to the input of original image data 112, the address required for read-out of decoded image data is generated by the to-be-coded region address generator 17 or to-be-transformed region address generator 19. The read-out original image data is output to a display 16, etc. The method described in connection with the sixth embodiment may be used as a method of finishing repetition in the decoding mode.

In the above embodiments, the shape of the to-be-coded region and to-be-transformed region was described as being rectangular; however, it may be triangular, etc. In addition, in the seventh embodiment, the memory has memory portions corresponding to two frames; however, this memory may have memory portions corresponding to three or more frames. In this case, first, addresses are set so that the memory portion for to-be-transformed regions does not overlap the memory portion for to-be-coded regions. Even if the functions of these memory portions are changed thereafter, the memory portions are made not to overlap each other.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A decoder comprising:
   first memory means for storing a code including such information on at least a to-be-transformed region and a transformation method that an error of a transformed image signal with reference to a to-be-coded image signal has a value less than a predetermined value, and a mean value of the pixels of a to-be-coded region, said transformed image signal being obtained by transforming a to-be-transformed image signal in accordance with a predetermined transformation method;
   designation signal outputting means for transforming the code read out from the first memory means to a to-be-transformed region designation signal and a transformation method designation signal, and outputting the transformed signals;
   second memory means for storing the to-be-transformed region image signal and outputting the to-be-transformed region image signal within the to-be-transformed region designated by the to-be-transformed region image designation signal;
   transforming means for transforming the to-be-transformed region image signal by means of the transformation method designation signal, outputting the transformation image signal, having the transformation image signal stored in said second memory means as the to-be-transformed region image signal, and repeating transformation until the to-be-transformed image signal is converged; and
   a circuit for correcting the transformation image signal by the mean value of the to-be-coded region and outputting the corrected transformation image signal as a decoded signal.

2. The decoder according to claim 1, wherein said second memory means is constituted by first and second frame memories for storing the to-be-transformed image signal, said transforming means transforms the to-be-transformed region image signal stored in said first frame memory, the transformation image signal is stored in said second frame memory as the to-be-transformed region image signal, the to-be-transformed region image signal of said second frame memory is then transformed, and the transformation image signal is stored in said first memory as the to-be-transformed image signal, and these operations are repeated.

3. The decoder according to claim 14, wherein said second memory means is constituted by a frame memory having first and second memory portions, and said transforming means is constituted by means for transforming the to-be-transformed image signals sequentially read out from said first memory portion, writing the transformation image signals in said second memory portion sequentially, transforming the transformation image signals sequentially read out from said second memory portion after the completion of transformation of one frame, and the transformation image signals are sequentially stored in said first memory portion, and these operations are repeated, thereby producing the decoded signal.

4. The decoder according to claim 3, wherein said transforming means includes means for alternately selecting address signals for designating said first and second memory portions.

5. The decoder according to claim 1, wherein said transforming means is constituted by means for transforming the to-be-transformed image signal read out from said second memory means, and storing the transformation signal at an address in said second memory means from which the to-be-transformed image signal has been read out.

* * * * *

UNITED STATES PATENT AND TRADEMARK OFFICE
CERTIFICATE OF CORRECTION

PATENT NO. : 5,331,436
DATED : July 19, 1994
INVENTOR(S) : Takashi IDA, et al.

It is certified that error appears in the above-indentified patent and that said Letters Patent is hereby corrected as shown below:

On the title page, Item [30], the Foreign Application Priority Date should read as follows:

--Jan. 7, 1991--

Signed and Sealed this

Fourth Day of October, 1994

Attest:

BRUCE LEHMAN

*Attesting Officer*     *Commissioner of Patents and Trademarks*